(12) United States Patent
Fan et al.

(10) Patent No.: US 8,711,519 B2
(45) Date of Patent: *Apr. 29, 2014

(54) SHALLOW TRENCH MEDIA

(71) Applicant: Seagate Technology LLC, Cupertino, CA (US)

(72) Inventors: Zhaohui Fan, Fremont, CA (US); David Kuo, Palo Alto, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,946

(22) Filed: Apr. 15, 2013

(65) Prior Publication Data

US 2013/0222948 A1  Aug. 29, 2013

Related U.S. Application Data

(63) Continuation of application No. 12/637,428, filed on Dec. 14, 2009, now Pat. No. 8,422,169.

(51) Int. Cl.
*G11B 5/82* (2006.01)

(52) U.S. Cl.
USPC .................... 360/135; 428/839; 428/839.6

(58) Field of Classification Search
USPC ............. 360/135; 428/839, 839.6, 839.2
See application file for complete search history.

(56) References Cited

U.S. PATENT DOCUMENTS

| | | |
|---|---|---|
| 5,723,033 A | 3/1998 | Weiss |
| 7,161,753 B2 | 1/2007 | Wachenschwanz et al. |
| 8,059,350 B2 | 11/2011 | Albrecht et al. |
| 8,130,468 B2 | 3/2012 | Albrecht et al. |
| 8,605,388 B2* | 12/2013 | Yasumori et al. .............. 360/135 |
| 2006/0121318 A1 | 6/2006 | Gage et al. |
| 2006/0222897 A1 | 10/2006 | Kamata et al. |
| 2007/0281078 A1 | 12/2007 | Kikitsu et al. |
| 2008/0002297 A1 | 1/2008 | Shirotori et al. |
| 2008/0123209 A1 | 5/2008 | Nakada et al. |
| 2008/0266701 A1 | 10/2008 | Albrecht et al. |
| 2009/0185308 A1 | 7/2009 | Kaizu et al. |
| 2010/0302682 A1 | 12/2010 | Hinoue et al. |
| 2011/0051282 A1 | 3/2011 | Fukushima |
| 2011/0171425 A1 | 7/2011 | Tabakovic et al. |
| 2011/0255193 A1 | 10/2011 | Hieda |
| 2011/0299194 A1 | 12/2011 | Aniya et al. |
| 2012/0069468 A1* | 3/2012 | Kamata et al. .............. 360/99.08 |
| 2012/0092790 A1* | 4/2012 | Hellwig et al. .................. 360/59 |
| 2012/0170152 A1* | 7/2012 | Sonobe et al. ................ 360/135 |

OTHER PUBLICATIONS

Restriction Requirement from the United States Patent and Trademark Office dated Mar. 19, 2012, for U.S. Appl. No. 12/637,428.

(Continued)

*Primary Examiner* — Jefferson Evans

(74) *Attorney, Agent, or Firm* — Westman, Champlin & Koehler, P.A.

(57) ABSTRACT

A shallow trench discrete track media structure is fabricated by etching a magnetic recording layer to provide a plurality of discrete magnetic data tracks separated by shallow trenches. Each shallow trench has a trench floor formed at a depth in the magnetic recording layer that is less than the thickness of the magnetic recording layer. Exposed regions of the magnetic recording layer beneath the trench floor are reacted with reactive plasma to diminish the magnetic moment of the exposed regions.

10 Claims, 5 Drawing Sheets

(56) References Cited

OTHER PUBLICATIONS

Office Action from the United States Patent and Trademark Office dated Jun. 15, 2012, for U.S. Appl. No. 12/637,428.

Final Office Action from the United States Patent and Trademark Office dated Dec. 14, 2012, for U.S. Appl. No. 12/637,428.

Notice of Allowance from the United States Patent and Trademark Office dated Jan. 31, 2013, for U.S. Appl. No. 12/637,428.

* cited by examiner

SHALLOW TRENCH MEDIA

CROSS-REFERENCE TO RELATED APPLICATION

The present application is a continuation of and claims priority from U.S. patent application Ser. No. 12/637,428, filed on Dec. 14, 2009, and entitled "Shallow Trench Discrete Track Media (DTM) and Pattern Transfer Process," the content of which is hereby incorporated by reference in its entirety.

FIELD OF THE INVENTION

The present invention relates generally to magnetic storage media.

BACKGROUND OF THE INVENTION

Discrete track media (DTM) has been proposed to increase the recording areal density of magnetic hard disk drives. As shown in the FIG. 1 plan view of a DTM structure 100, a thin film magnetic recording layer is patterned to provide discrete magnetic data tracks 102 separated by trenches 104.

SUMMARY OF THE INVENTION

The present invention provides a shallow trench discrete track media structure and methods for fabricating the shallow trench structure. A magnetic recording layer is etched to form a plurality of shallow trenches in the recording layer, thereby defining a plurality of discrete magnetic data tracks. Each shallow trench has a trench floor formed at a depth in the magnetic recording layer that is less than the thickness of the magnetic recording layer. A region is formed in the magnetic recording layer beneath each trench floor that has a magnetic moment that is less than the magnetic moment of the magnetic recording layer.

Additional features and advantages of the present invention will become readily apparent to those skilled in the art from the following detailed description of the invention, wherein exemplary embodiments are shown and described. As will be realized by those skilled in the art, the invention is capable of other and different embodiments, and its several details are capable of modification in various respects, all without departing from the scope of the present invention. Accordingly, the drawings and description provided herein should be considered illustrative, not restrictive.

DETAILED DESCRIPTION OF THE INVENTION

The present invention provides a shallow trench discrete track media (DTM) structure, and methods for making the DTM structure, wherein only a portion of the magnetic recording layer is removed to form shallow trenches that define discrete magnetic data tracks. The magnetic moment of the magnetic material that remains beneath the shallow trench is diminished by reaction with reactive plasma. The resulting trench depth can be as shallow as about 5-6 nm or less.

Figure 1:
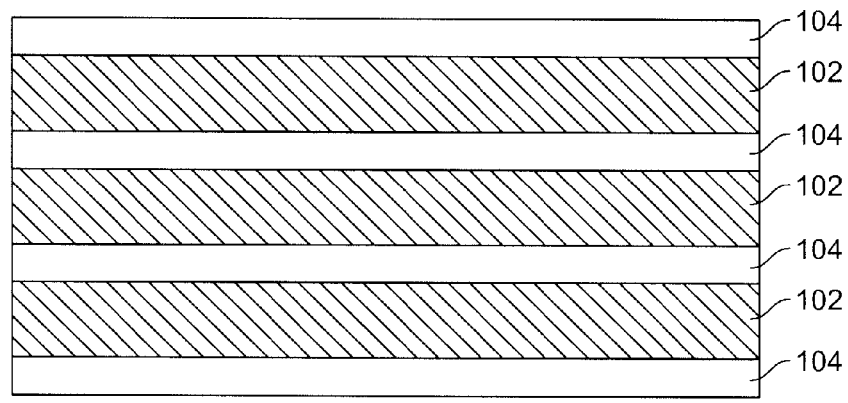
FIG. 1 is a schematic drawing illustrating a plan view of a discrete track media (DTM) structure.
Figure 2:
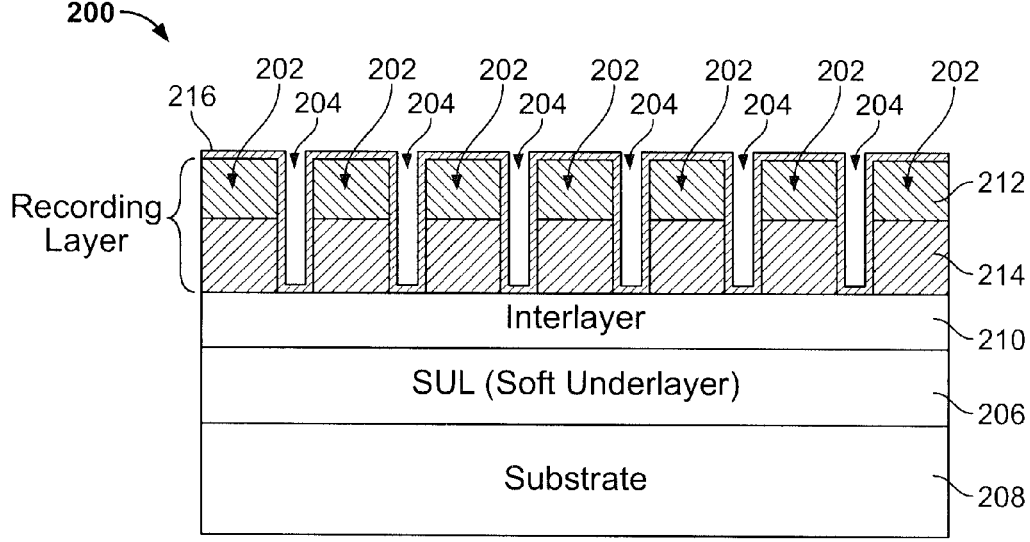
FIG. 2 is a cross-section view of a discrete track media (DTM) structure.

As shown in the FIG. 2 cross-section view, a DTM structure 200 comprises a magnetically soft underlayer (SUL) 206 formed on substrate 208 (e.g., glass). An interlayer 210, which can serve as a seed layer for the magnetic recording layer, is formed on the SUL 208. The discrete magnetic data tracks 202 of the recording layer are formed on the interlayer 210 and separated by trenches 204. Each of the magnetic recording layer data tracks 202 comprises an upper continuous magnetic layer 212 formed on a lower granular magnetic layer 214. FIG. 2 shows a protective carbon overcoat (COC) layer 216 formed over the data tracks 202 and trenches 204.

Diminishing the magnetic moment in the trenches between the discrete magnetic data tracks allows the benefits of DTM to be achieved. For a magnetic media design, the magnetic recording layer has a thickness of about 16-20 nm. If all of the magnetic material in the trenches needs to be removed to achieve the desired magnetic moment, the resulting trench depth will be greater than 16 nm. Trenches of this depth cause flyability and reliability problems for trenched media. The deep trenches also make planarization difficult due to their high aspect ratios. Thus, shallow trenches are desirable.

FIGS. 3A-3E show a sequence of process steps for fabricating a shallow trench DTM structure in accordance with an embodiment of the present invention.

Figure 3A:
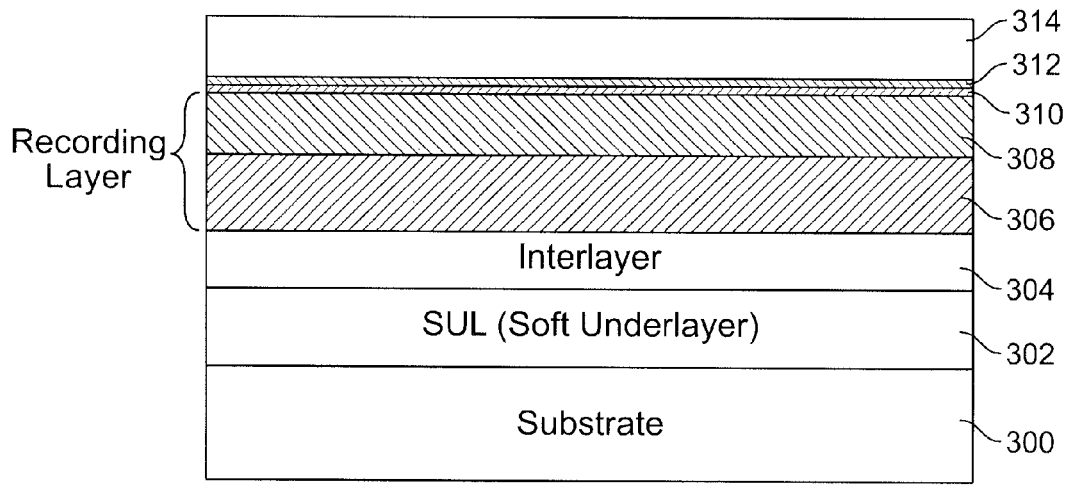
FIGS. 3A-3E are cross section drawings illustrating a method of fabricating a shallow trench DTM structure in accordance with the concepts of the present invention.

FIG. 3A shows a substrate 300 having a magnetically soft underlayer (SUL) 302 formed on its upper surface. An interlayer 304, which can serve as a seed layer for the magnetic recording layer, is formed on the SUL 302. A magnetic recording layer comprising a lower magnetic granular layer 306 and an upper continuous magnetic layer 308 is formed on the interlayer 304. A carbon overcoat (COC) layer 310, e.g., diamond-like carbon (DLC), is formed on the upper continuous magnetic layer 308. An adhesion layer 312 is formed on the COC layer 310 and a layer of resist 314 is formed on the adhesion layer 312.

The substrate 300 can be any well known material typically utilized for this purpose, e.g. a non-magnetic alloy or metal such as aluminum (Al). Alternatively, substrate 300 may be comprised of glass, ceramic, glass-ceramic polymeric material, or a composite laminate of these materials. The SUL 302 has a thickness of at least 15-20 nm and magnetic permeability >50; the SUL 302 can be formed as a laminated structure to suppress domain formation, which can result in an unwanted source of medium noise. The SUL 302 can be formed of, for example, permalloy, or other magnetically soft Fe, Co and/or Ni alloys. The interlayer 304 should provide the crystalline growth epitaxy for the hard magnetic recording layer and prevent the diffusion of the hard and soft magnetic materials. Suitable materials for the interlayer 304 are, for example, Ta or Ru. The magnetically hard recoding layer can be formed of, for example, Co alloys containing one or more of Pt, Cr, Fe, Ni or B. More specifically, the lower granular magnetic layer 306 can comprise $CoCrPt(SiO_2)$ and the upper continuous magnetic layer 308 can comprise CoCrPtB.

As stated above, the COC layer 310 is typically DLC. The adhesion layer 312 may comprise polymeric components with a carboxylic functional group capable of bonding to the COC layer 310 by forming covalent bonds, and with an additional functional group capable of bonding with the resist 314. For example, the adhesion layer 312 may comprise Valmat, which is commercially available from Molecular Imprints, Inc. and applied in a Yield Engineering Systems YES-1224P vapor deposition oven. The typical materials utilized for the adhesion layer 312 comprise a multi-functional component having two ends and a linker group between the two ends. One end includes a tetravalent atom, such as a carboxylic functional group. The linker group is a hydrocarbon group with multiple carbon atoms. Covalent bonding is formed between the tetravalent atom of the first end and the COC layer 310, while the second end of the multi-functional component binds to the resist 314. Further information regarding adhesion layer 312 may be obtained by reference to U.S. Patent Application Publication No. 2007/0212494, published on Sep. 13, 2007, and which is hereby incorporated by reference herein in its entirety.

The resist layer 314 is then formed on the upper surface of the adhesion layer 312 in the conventional manner, e.g., by spin coating or by drop dispensing, resulting in the structure shown in FIG. 3A. The resist 314 typically comprises a thermoplastic material that can be heated to above its glass temperature, such that the material exhibits low viscosity and enhanced flow, or the resist 314 can be a UV-curable monomer that is liquid at room temperature and cured by UV exposure (e.g., Monomat, which is commercially available from Molecular Imprints, Inc.)

Figure 3B:
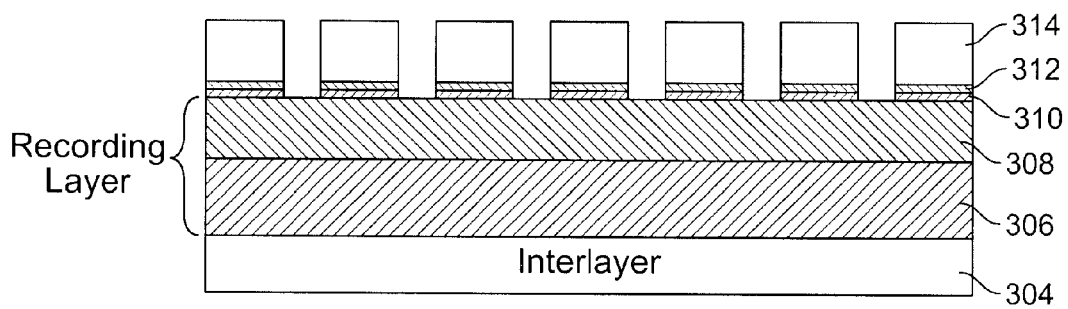
Figure 3C:
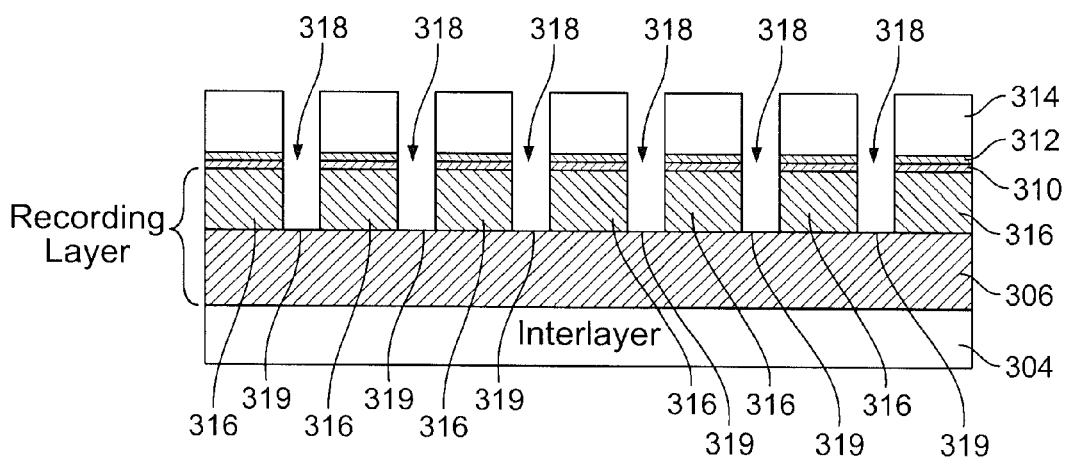

As shown in FIG. 3B, the resist 314, and the underlying adhesion layer 312 and COC layer 310, are patterned according to conventional techniques to expose surface regions of the upper continuous magnetic layer 308. The upper continuous magnetic layer 308 is then etched, utilizing for example ion beam etch (IBE), wet-etch or reactive ion etch (RIE), stopping on the lower magnetic granular layer 306, as shown in FIG. 3C, to provide discrete data tracks 316 of the upper continuous magnetic layer 308 separated by shallow trenches 318. Etch stop is controlled by timing with knowledge of the etch rate of the upper continuous magnetic layer 308. More specifically, the thickness of the upper continuous magnetic layer 308 is known after discs have been made by sputtering; etch rates of the material (e.g., CoCrPtB) comprising the upper continuous magnetic layer 308 have been pre-calibrated. Thus, using the thickness of the upper continuous magnetic layer 308 and its known etch rate, the time required for removal of the material of the upper continuous magnetic layer 308 to form shallow trenches 318 is known.

FIG. 3C shows each shallow trench 318 having a trench floor 319 formed at the interface between the upper continuous magnetic layer 308 and the lower magnetic granular layer 306, i.e. on the upper surface of the lower magnetic granular layer 306. Those skilled in the art will appreciate that the trench floor 319 need not be precisely located on the upper surface of the lower magnetic granular layer 306 and may be formed at a depth in the magnetic recording layer that is less than the thickness of the magnetic recording layer. For example, the trench floor 319 may be formed at a depth within the magnetic recording layer that is greater than the depth of the interface between the upper continuous magnetic layer 308 and the lower magnetic granular layer 306.

Figure 3D:
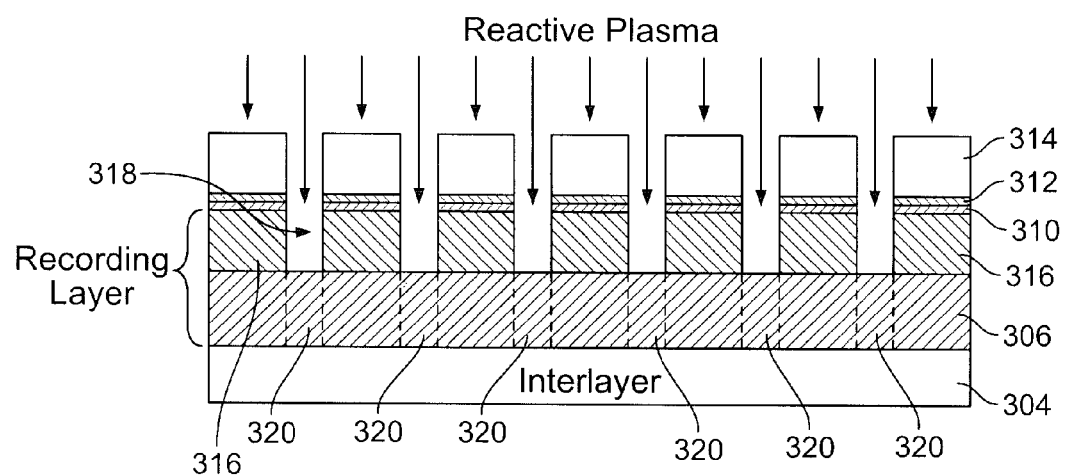

As shown in FIG. 3D, with the patterned resist 314 still in place, the lower magnetic granular layer 306 is then exposed to reactive plasma gas. The discrete magnetic data tracks 316 that have been formed from the upper continuous magnetic layer 308 are dense and difficult to damage by chemical reaction, e.g., CoCrPtB. On the other hand, the lower magnetic granular layer 306 comprises magnetic grains surrounded by porous oxide grain boundaries, e.g., CoCrPt ($SiO_2$). This microstructure makes the lower magnetic granular layer 306 reactive to many plasma gases, (e.g., $O_2$, $CF_4$, $CHF_3$, $Cl_2$) resulting in the formation of non-magnetic cobalt compounds (e.g., $Co_2O_3$, $CoF_3$, $CoCl_3$) and, thus, diminished magnetic moment in exposed regions 320 of the magnetic granular layer 306 beneath the trenches 314, as shown in FIG. 3D. While FIG. 3D shows the regions 320 of diminished magnetic moment extending completely through the lower magnetic granular layer 306 to the upper surface of the interlayer 304, it should be understood that these regions 316 can extend only partially through the granular layer 306 depending upon the application.

Figure 3E:
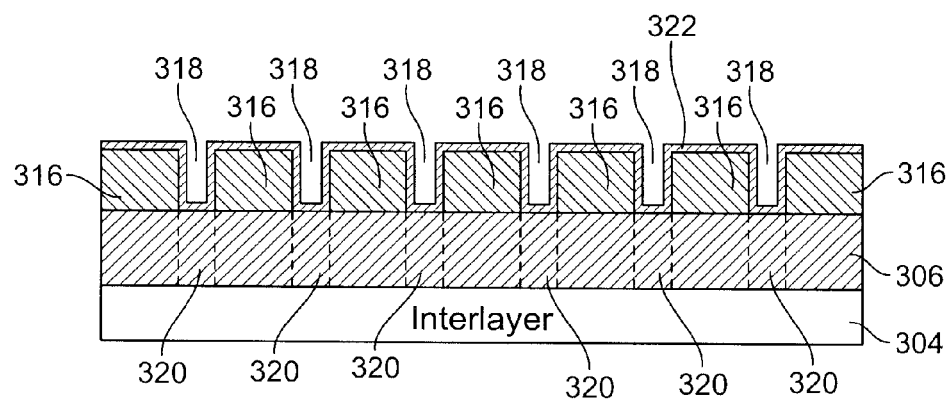

The remaining portions of the resist 314, adhesion layer 312 and original COC layer 310 are then removed utilizing conventional techniques and a new COC layer 322, e.g., DLC, is formed utilizing plasma chemical vapor deposition (CVD) to protect the exposed surface regions of the upper continuous magnetic discrete data tracks 316 and the exposed surfaces of the shallow trenches 318, resulting in the structure shown in FIG. 3E.

Figure 4:
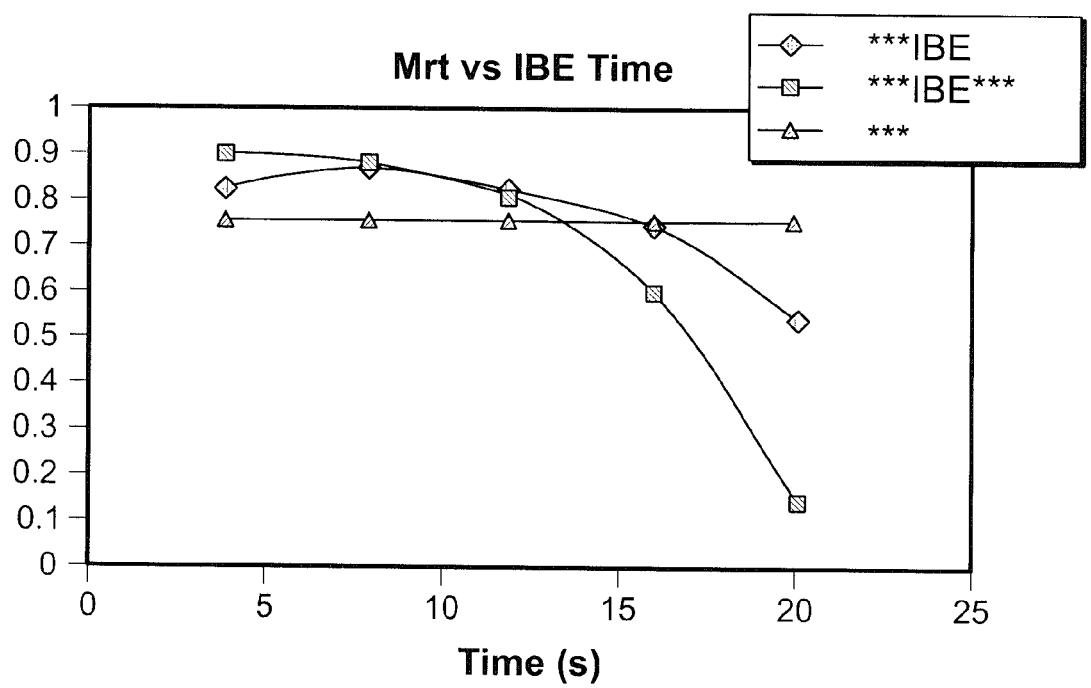
FIG. 4 is a graph plotting Mrt changes in a DTM structure with ion beam etch (IBE) time and exposure to $O_2$ plasma in accordance with the concepts of the present invention.

FIG. 4 shows how the remnant magnetization of the FIG. 3E structure changes with IBE and $O_2$ plasma treatment of the magnetic recording layer in an Anelva RIE chamber under the following conditions: $O_2$=50 sccm, Ar=10 sccm, 200 W, bias=−30V. After the upper continuous magnetic layer is etched by IBE to form discrete magnetic data tracks, the Mrt (a measure of magnetic moment) of the lower granular magnetic layer drops significantly after exposure to $O_2$ plasma.

Figure 3F:
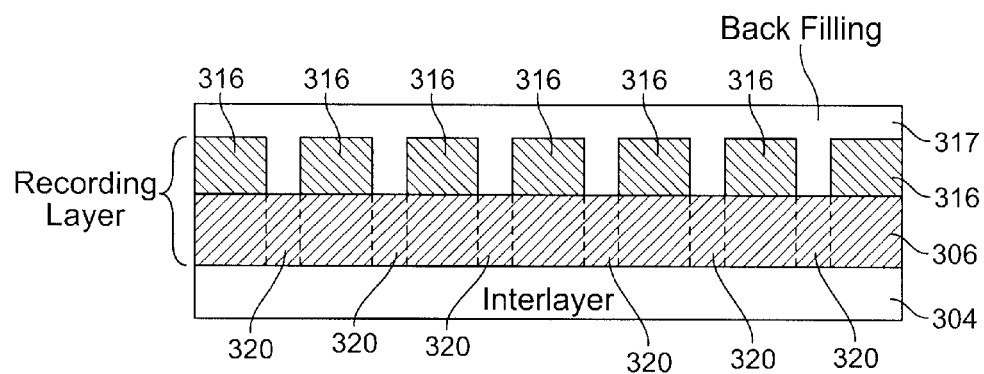
FIGS. 3F-3H are cross section drawings illustrating a process module for fabricating a planarized shallow trench DTM structure in accordance with the concepts of the present invention.
Figure 3G:
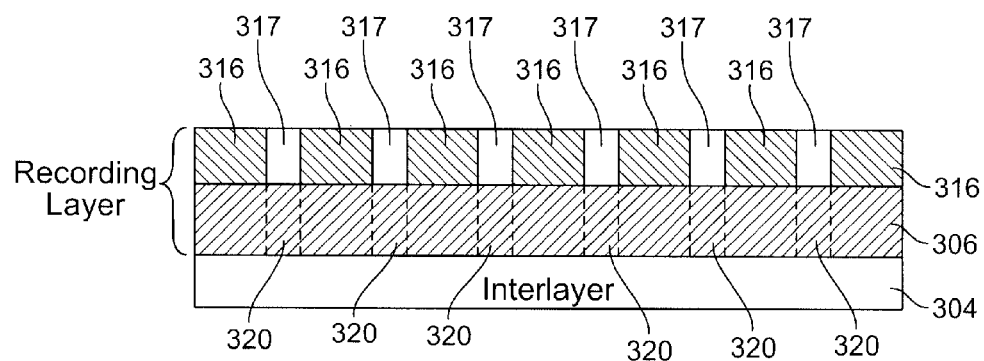
Figure 3H:
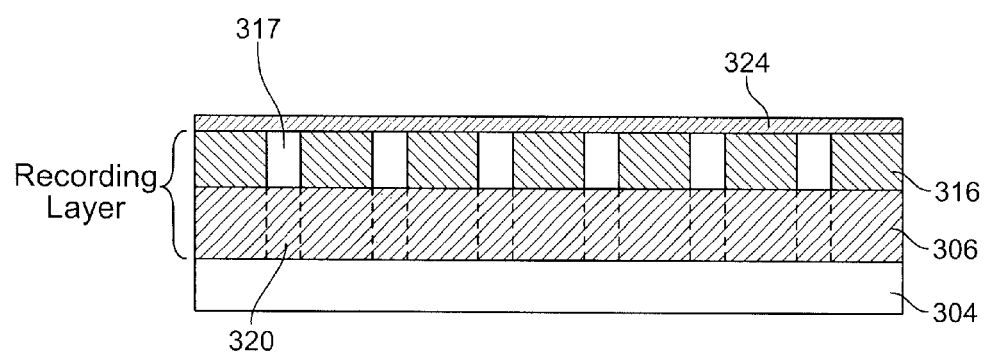

FIGS. 3F-3H show a sequence of process steps for providing a planarized shallow trench DTM in accordance with concepts of the present invention.

As shown in FIG. 3F, following the reactive plasma etch of the upper continuous magnetic layer 308 to provide discrete data tracks 316 separated by shallow trenches 318, and following removal of the remaining portions of the resist 314, adhesion layer 312 and original COC layer 310, as described above, the shallow trenches 318 are back-filled utilizing for example C, NiTa, $Al_2O_3$ or $SiO_2$. The back-fill process may be implemented utilizing, for example, DC sputtering, RF sputtering or CVD, with high pressure and high bias. The back-filled material 317 is then planarized as shown in FIG. 3G utilizing, for example, chemical mechanical polishing (CMP) or etch-back techniques. A new COC layer 324, e.g., DLC formed by plasma CVD, is then formed on the planarized structure to provide the planarized shallow trench DTM structure shown in FIG. 3H.

It should be understood that the particular embodiments of the present invention described in this application have been provided as non-limiting examples and that other modifications and variations may occur to those skilled in the art without departing from the scope of the invention as expressed in the appended claims and their equivalents.

What is claimed is:

1. An apparatus comprising:
  a magnetic recording layer having a plurality of trenches, the magnetic recording layer having a first magnetic moment and a thickness, each trench having a trench floor at a first depth in the magnetic recording layer that is less than the thickness of the magnetic recording layer; and
  a region in the magnetic recording layer beneath each trench floor having a second magnetic moment that is less than the first magnetic moment,
  wherein the magnetic recording layer includes an upper continuous magnetic layer on a lower granular magnetic layer.

2. The apparatus of claim 1, wherein the trench floor is at an upper surface of the lower granular magnetic layer.

3. The apparatus of claim 2, wherein the region having the second magnetic moment extends from the upper surface of the lower granular magnetic layer to a depth beneath the upper surface of the lower granular magnetic layer.

4. The apparatus of claim 1, and further comprising:
non-magnetic back-fill material formed in the trenches.

5. The apparatus of claim 1, and further comprising:
a carbon overcoat layer formed on exposed surfaces of the trenches.

6. An apparatus comprising:
a magnetic recording layer having a first magnetic moment and a thickness;
means for separating portions of the magnetic recording layer, the means having a floor at a first depth in the magnetic recording layer that is less than the thickness of the recording layer; and
a region in the magnetic recording layer beneath the floor having a second magnetic moment that is less than the first magnetic moment,
wherein the magnetic recording layer includes an upper continuous magnetic layer on a lower granular magnetic layer.

7. The apparatus of claim 6, wherein the floor is at an upper surface of the lower granular magnetic layer.

8. The apparatus of claim 7, wherein the region having the second magnetic moment extends from the upper surface of the lower granular magnetic layer to a depth beneath the upper surface of the lower granular magnetic layer.

9. The apparatus of claim 6, and further comprising:
non-magnetic back-fill material in the means for separating the portions of the magnetic recording layer.

10. The apparatus of claim 6, wherein the means for separating the portions of the magnetic recording layer comprises a trenching means for separating the portions of the magnetic recording layer.

* * * * *